March 31, 1970     M. BORDES     3,503,586
VALVES
Filed June 7, 1968
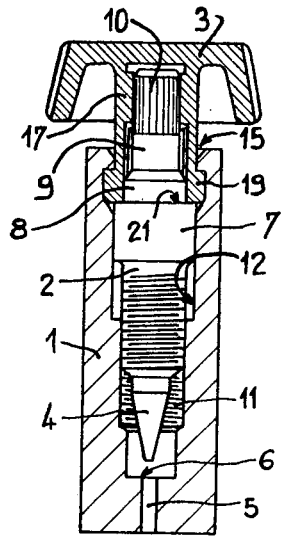
Fig. 1
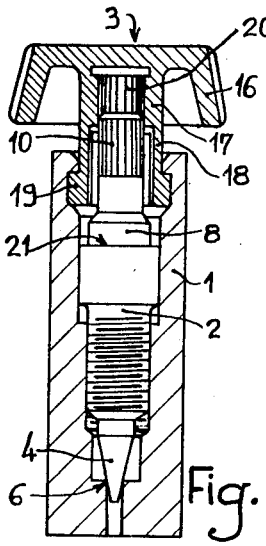
Fig. 2
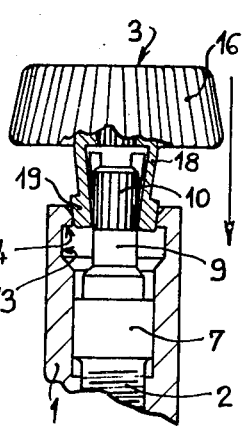
Fig. 3
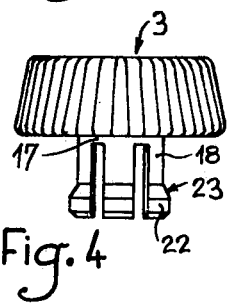
Fig. 4
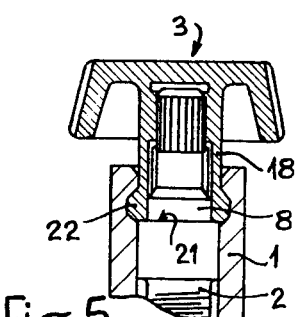
Fig. 5
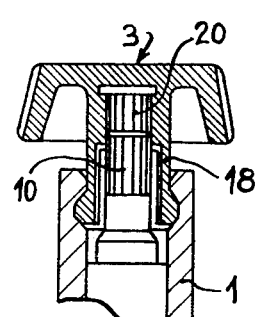
Fig. 6
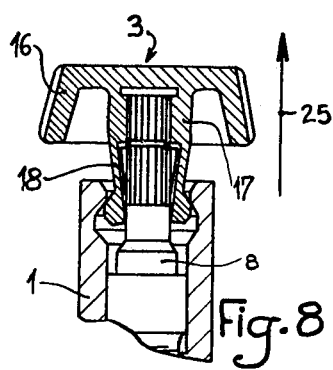
Fig. 8
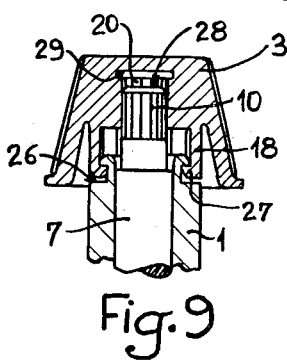
Fig. 9
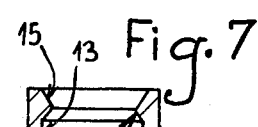
Fig. 7
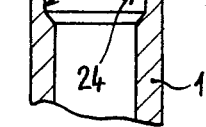
INVENTOR
Maurice Bordes
BY
Alexander Nowell
ATTORNEYS United States Patent Office 3,503,586
Patented Mar. 31, 1970

1

3,503,586
VALVES
Maurice Bordes, Saint-Genis-Laval, France, assignor to Application des Gaz, Paris, France, a French joint-stock company
Filed June 7, 1968, Ser. No. 735,210
Claims priority, application France, June 21, 1967, 48,820
Int. Cl. F16k 31/50, 31/60
U.S. Cl. 251—266                                    10 Claims

ABSTRACT OF THE DISCLOSURE

In a valve having a closure member actuated by a screw-threaded spindle (e.g. a needle valve), the operating knob is angularly connected with but axially slidable on the end of the spindle and it is formed with a resilient extension which surrounds the spindle, this extension being radially deformable (e.g. by being longitudinally slitted), and the extension carries projections which snap into a groove of the valve body when the knob is pushed on the spindle. The operating knob is thus retained in axial position while being free to rotate.

---

The present invention relates to valves in which the closure member is actuated by a threaded spindle and more particularly to valves of the needle type in which the conical end of the spindle forms the closure member of the valve.

In such valves the actuating screw-threaded spindle protrudes outwardly from the valve body in order to carry an appropriate operating member such as a knob. When the valve is operated, the operating member moves with the actuating spindle not only angularly, but also axially, which is frequently a disadvantage. Furthermore it is necessary to provide a number of additional parts such as screws, nuts and the like to secure the operating member to the outer end of the spindle. Also the displacement of the operating spindle in the direction corresponding to the opening of the valve has to be limited by a stop which must be mounted on the valve body, which of course increases manufacturing costs.

A first object of this invention is to provide a valve wherein the operating member may rotate without any axial displacement.

Another object of the invention is to provide a valve wherein the stroke of the actuating spindle in the direction corresponding to the opening of the valve is limited by the operating member itself without any particular additional stop member.

According to the present invention in a valve of the kind above referred to, the operating member is mounted on the end of the actuating spindle remote from the closure member of the valve in such a manner as to be angularly connected with the said end, but free to move axially with respect thereto, and it is provided with an extension which surrounds the spindle, which may be deformed elastically in the radial direction, and which carries at its end remote from the operating member projections adapted to fit into a circular groove of the valve body to axially retain the operating member while leaving same free to rotate.

The groove of the valve body is preferably provided within the latter, the projections of the extension of the operating member being directed outwardly. But it is

2 possible to provide the groove on the outside of the valve body, the projections of the extension being directed inwardly.

The extension of the operating member is conveniently formed of a sleeve made of an elastically deformable material, the said sleeve having longitudinal slits which delimits tongues capable of being expanded or contracted radially with respect to each other, the inner diameter of the slitted portion of the sleeve being larger than the diameter of the portion of the spindle which is located within the said slitted portion when the spindle is engaged into the valve body to its maximum.

In accordance with another feature of the present invention, when the groove is provided within the valve body, the spindle comprises at a distance from its end angularly connected with the operating member, a portion of enlarged diameter which, when the spindle is disengaged from the valve body to its maximum, is disposed with a reduced radial clearance in the slitted portion of the sleeve to prevent any substantial contraction of the latter.

With such a construction it is possible to provide on the actuating spindle a stop portion of larger diameter than the enlarged portion above referred to and situated on the side of the latter remote from the end connected with the operating member, in order to determine a shoulder which, when the valve is at its fully open position, engages the end of the slitted portion of the sleeve in order to limit the outward stroke of the spindle.

In the annexed drawings:

FIG. 1 is a sectional view of a needle valve with an inner groove according to the invention, the parts being illustrated at the open position of the valve.

FIG. 2 shows the same valve at the closed position.

FIG. 3 shows how the operating knob is mounted on the valve body.

FIG. 4 is a side view of a modified operating knob.

FIGS. 5 and 6 are fragmental sections illustrating a needle valve equipped with the operating knob of FIG. 4, respectively at the open and at the closed position.

FIG. 7 is a section of the upper portion of the body of the valve of FIGS. 5 and 6.

FIG. 8 shows how the operating knob of FIG. 4 may be removed from the valve body in the embodiment of FIGS. 5 and 6.

FIG. 9 is a fragmental sectional view of a valve with an outer groove according to the invention.

The needle valve of FIGS. 1 to 3 comprises a body 1, a screw-threaded spindle 2, an operating knob 3 adapted to rotate the spindle, and a closure member 4 formed by the inner conical end of the spindle and adapted to cooperate with the edge 6 of an opening which forms the end of a canal 5.

Above its screw-threaded portion spindle 2 comprises a portion 7, of large diameter, which will be hereinafter termed stop portion, an adjacent portion 8 of somewhat smaller diameter, and finally a portion 9 of still smaller diameter, the upper end of which is fluted, as indicated at 10. Spindle 2 is screwed into body 1 which is provided for this purpose with a correspondingly screw-threaded bore 11. Above this bore 11 and co-axially thereto the valve body 1 is formed with a cylindrical housing 12 in which portion 7 of spindle 2 may rotate and slide with a small clearance. An O-ring, not illustrated, is preferably provided within housing 12 in an appropriate groove to form a seal between portion 7 and body 1. The upper portion of housing 12 has an inner groove 13 (FIG. 3) the upper edge of which is in the form of a flat annular surface transversely disposed with respect to the axis of the housing. Housing 12 opens outwardly in the form of a flaring end 15.

The operating knob 3 is preferably made of a resilient plastic material. It comprises a head in the form of a cap with a serrated edge 16. This head is integral with a downwardly extending sleeve 17 the lower portion of which has a plurality of longitudinal slits which define juxtaposed tongues 18 and each tongue 18 carries at its lower end an outwardly directed projection 19 adapted to fit into groove 13. The upper portion of sleeve 17 is formed with inner longitudinal ribs 20 to cooperate with the fluted end 20 of the screw-threaded spindle 2.

It will be noted that the inner diameter of the slitted portion of sleeve 17 is substantially equal to the diameter of portion 8 of spindle 2.

The valve described is mounted as follows:

The actuating spindle 2 is first screwed down into the valve body 1 (closed position of the valve), the operating knob is then disposed on the outer end of the spindle and it is pushed against the valve body. Owing to the flaring outer end 15 of housing 12, tongues 18 contract against one another in such manner that their projections 19 can thus enter the housing and slide downwardly therein until they meet groove 13 into which they snap under the action of the resiliency of tongues 18 which act as spring blades. The parts then assume the position of FIG. 2.

It will be understood that at this position the operating knob 3 is axially retained with respect to valve body 1, but that it may freely rotate together with spindle 2. The latter may thus be unscrewed to open the valve.

Towards the end of the opening stroke of spindle 2, portion 8 thereof (which will be hereinafter called enlarged portion) slides upwardly with limited clearance into the slitted lower portion of sleeve 17, whereby any substantial contraction of the latter becomes impossible. The stop portion 7, the diameter of which is still larger than the diameter of enlarged portion 8, determines with respect to the latter a shoulder 21 which comes into engagement with the lower end of the slitted portion of sleeve 17, whereby the opening movement of spindle 2 is positively stopped. The parts then assume the position of FIG. 1. Even a relatively high torque cannot further raise spindle 2, since tongues 18 are positively retained against any contraction.

In the modification of FIGS. 4 to 6 the projections 22 carried by tongues 18 have an oblique upper edge 23 which corresponds to a downwardly opening cone and groove 13 is correspondingly shaped as illustrated in FIG. 7.

The operation remains substantially as above-described with reference to FIGS. 1 to 3, but at the closed position of the valve (FIG. 6), when the enlarged portion 8 of the spindle 2 is disengaged from the tongues 18, the operating knob 3 may be pulled upwardly as indicated by arrow 25 in FIG. 8, which is impossible with the embodiment of FIGS. 1 to 3, while at the open position of FIG. 5, enlarged portion 8 here again prevents any contraction of tongues 18.

In the embodiment of FIG. 9 the groove, here referenced 26, is provided on the outside of the valve body 1. Tongues 18 then surround the upper end of body 1 and their projections 27 are directed inwardly so as to snap into groove 26 under the action of the resiliency of the tongues which expand radially when the operating knob 3 is pushed on spindle 2. The upward stroke of the latter is limited by engagement of its upper end face 28 against the lower side 29 of the central portion of knob 3.

I claim:
1. In a valve comprising a valve body having a fluid passage, a screw-threaded bore in front of said passage, a cylindrical housing co-axial to said bore and opening outwardly, a closure member co-operating with said passage to close or open same; an actuating spindle having an inner end to carry said closure member, a screw threaded portion co-acting with said screw-threaded bore to determine axial movement of said spindle and of said closure member between a closed and an open position, and an outer end through which said spindle is rotated; and an operating member exterior to said body and mounted on said outer end of said spindle to effect rotation of same; the improvement according to which said operating member and said outer end of said spindle are so formed as to be angularly connected with each other to rotate in unison, while remaining free to slide axially with respect to each other; said operating member has a tubular extension which surrounds said outer end of said actuating spindle, said extension being resiliently deformable in a direction radial to said spindle, said extension carrying at its end remote from said operating member radial projections; and said valve body has a circular groove to receive said projections to retain said operating member axially of said body, while permitting said operating member to rotate on said body to operate rotation of said actuating spindle.

2. In a valve as claimed in claim 1, said groove being interior to said body and said projections being directed outwardly.

3. In a valve as claimed in claim 2, said cylindrical housing having an inner periphery and said groove being formed in said periphery; said extension being in the form of a sleeve made of a resilient material and having a terminal portion remote from said operating member and formed with longitudinal slits to determine a plurality of resilient tongues each carrying one of said projections; and said slitted portion of said sleeve having an inner diameter larger than the diameter of the portion of said actuating spindle which is located within said slitted portion at the closed position of the valve.

4. In a valve as claimed in claim 3, said spindle having between its outer end and its screw-threaded portion a portion of enlarged diameter which at the closed position of the valve is axially spaced from said slitted portion of said sleeve and which at the open position of the valve is engaged in said slitted portion, the diameter of said enlarged portion being substantially equal to the inner diameter of said slitted portion to prevent same from contracting radially.

5. In a valve as claimed in claim 4, the inner diameter of the slitted portion of said sleeve being smaller than the inner diameter of said cylindrical housing of said valve body; said actuating spindle having between said portion of enlarged diameter and said screw-threaded portion a stop portion of larger diameter than said enlarged portion, said stop portion defining within said cylindrical housing a shoulder facing said enlarged portion; and said slitted portion of said sleeve having a free end which at the open position of the valve, is engaged by said shoulder to limit outward movement of said spindle.

6. In a valve as claimed in claim 5, said stop portion being cylindrical and in sliding engagement with the inner periphery of said cylindrical housing.

7. In a valve as claimed in claim 1, said groove being exterior to said body and said projections being directed inwardly.

8. In a valve as claimed in claim 7, said operating member having a central portion forming an abutment for the end of said actuating spindle remote from said closure member to limit the outward movement thereof.

9. In a valve as claimed in claim 1, said projections having one edge facing said operating member and substantially situated in a plane transverse to said actuating spindle; and said groove having a complementary edge also substantially situated in a plane transverse to said spindle and cooperating with said one edge of said projections to retain said operating member axially of said body.

10. In a valve as claimed in claim 1, said projections having an edge facing said operating member and oblique with respect to said spindle; and said groove having a complementary edge also oblique with respect to said spindle to permit of pulling said sleeve free from said valve body at the closed position of the valve by deforming said extension radially.

References Cited

UNITED STATES PATENTS 3,409,271  11/1968  Kallenbach _____ 251—266 X

FOREIGN PATENTS 449,119  6/1936  Great Britain.

WILLIAM F. O'DEA, Primary Examiner

DAVID R. MATTHEWS, Assistant Examiner

U.S. Cl. X.R.

16—114; 74—553; 137—315; 251—284, 291